July 25, 1944.　　　　C. C. FRANCK　　　　2,354,587

METHOD OF MANUFACTURING TURBINE BLADES

Filed Jan. 31, 1942

WITNESSES:
James K. Moser
Andrew J. Cook

INVENTOR
CLARENCE C. FRANCK,
BY R. B. Rawis
ATTORNEY

Patented July 25, 1944

2,354,587

UNITED STATES PATENT OFFICE 2,354,587

METHOD OF MANUFACTURING TURBINE BLADES

Clarence C. Franck, Swarthmore, Pa., assignor to Westinghouse Electric & Manufacturing Company, East Pittsburgh, Pa., a corporation of Pennsylvania Application January 31, 1942, Serial No. 429,025

3 Claims. (Cl. 29—156.8)

The invention relates to turbine blades formed in unitary segments and it has for an object to provide a method of production thereof comprising providing blade elements having root and shroud portions connected by blade portions whose edges are thickened or bulbous, assembling blades in a segment and welding the root and shroud portion thereof together to form segment root and shroud constructions, and machining the segment so formed to provide finished shroud and root construction surfaces and blade edges having a desired degree of sharpness.

This and other objects are effected by the invention as will be apparent from the following description and claims taken in connection with the accompanying drawing, forming a part of this application, in which:

In accordance with the invention, there is provided a plurality of blades which are constructed and arranged to be welded together to form a segment; and, after welding, the segment is machined to provide suitable root and shroud surfaces and blade edges of desired sharpness.

Figure 1:
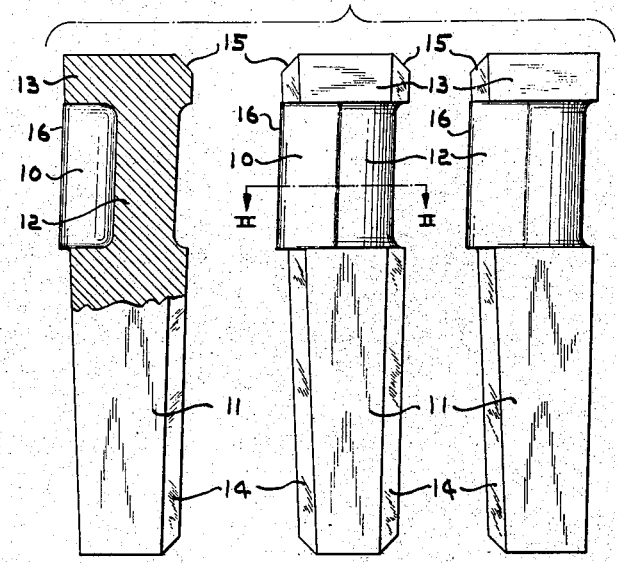
Fig. 1 is an exploded view showing a plurality of blade elements adapted to be assembled to form a segment.
Figure 2:
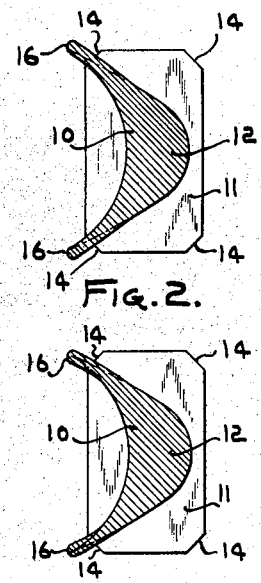
Fig. 2 is a sectional view taken along the line II—II of Fig. 1 and showing thickened blade portion edges.
Figure 3:
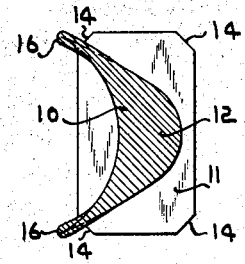
Fig. 3 is a view similar to Fig. 2 but indicating a difference in sharpening of the thickened blade portion edges.

In Fig. 1, there are shown three blades 10 which are arranged to be assembled as a segment and welded together.

Each blade 10 includes a root portion 11, a blade portion 12, and a shroud portion 13. Before assembly of the blades to form a segment, the adjacent edges of the root and shroud portions are beveled, as shown at 14 and 15 so as to provide V-grooves at adjacent side edges of the shroud and root portions of the segment. Also, each blade portion 12 is formed with thickened or bulbous edges 16.

Figure 4:
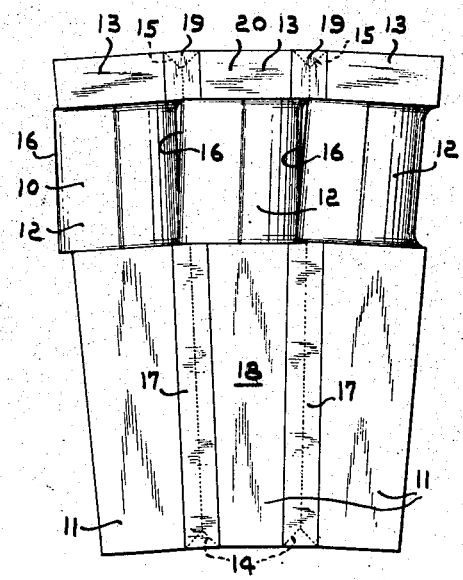
Fig. 4 is a side elevational view showing a plurality of blades assembled and welded together to form a segment.
Figure 5:
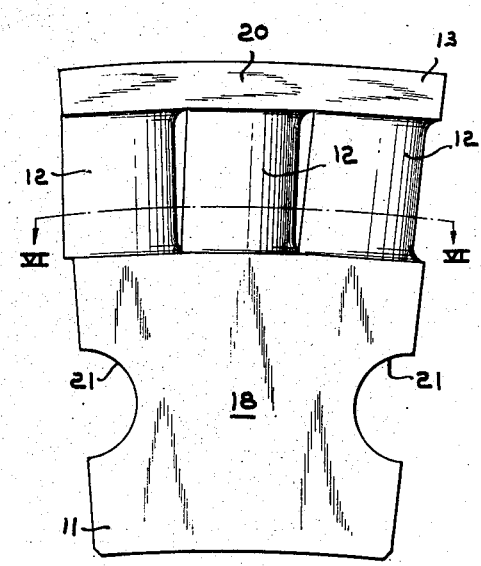
Fig. 5 is a view similar to Fig. 4 but showing the structure after machining; and, Fig. 6 is a sectional view taken along the line VI—VI of Fig. 5 but showing the thickened inlet and exit edges of the blade portions machined to a desired degree of sharpness.

The blades of each segment having the feature just referred to are assembled and the V-grooves formed by the bevels at adjacent side and bottom edges of the root portions are filled with weld metal, at 17 in Fig. 4, to form the unitary segment root construction, at 18. Likewise, the V-grooves of the shroud elements 13 are filled with weld metal to form the segment shroud construction, at 19. After welding the blades together to form the segment, the latter is annealed so as to remove all stresses.

Figure 6:
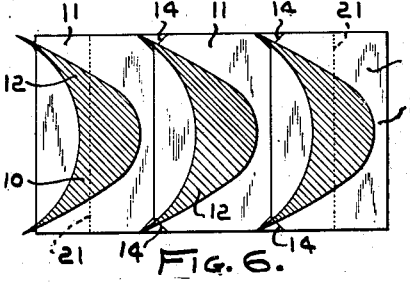

Following annealing, the segment is machined, machining involving finishing the side and bottom surfaces of the root construction, at 18, the side and top surfaces of the shroud construction, at 20, the provision of suitable segment holding features, such as the semi-circular openings 21 for reception of pins fastening the segments to a rotor, and finishing of the thickened or bulbous edges 16 so that the latter have a desired degree of sharpness, as shown in Fig. 6.

The provision of the blade portions 12 with thick edges 16 is desirable in order to protect the blade portions during various operations involved in the construction of the segment, such an edge being more resistant to burning or temperature effects than a sharp edge and being less likely to be injured during heat treament or machining operations occurring prior to edge finishing, machining to finish the edges, preferably, being the final step occurring in the manufacture of the segment.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. The method of manufacturing unitary blade segments comprising providing blades each having integral root, blade and shroud portions and each blade portion having inlet and exit edge portions of thickened or bulbous section such that the section of the blade portion extends beyond the boundaries of the normal blade section having relatively sharp inlet and exit edges; arranging a plurality of said blades to form a segment; welding adjacent edges of the shroud and root portions of each segment; and thereafter machining the thickened inlet and exit edges of the blade portions of each segment to provide edges of desired sharpness.

2. The method of manufacturing unitary blade segments comprising providing blades each having integral root, blade and shroud portions and each blade portion having inlet and exit edge portions of thickened or bulbous section such that the section of the blade portion extends beyond the boundaries of the normal blade section having relatively sharp inlet and exit edges, assembling such blades in a segment; the root and shroud portions of the blades of the segment having the adjacent side edges beveled so as to form V-grooves; depositing weld metal in the grooves to join the blades of each segment; and thereafter machining the thickened inlet and exit edges of each blade portion to provide edges of desired sharpness.

3. The method of manufacturing unitary blade segments comprising providing blades each having integral root, blade and shroud portions and each blade portion having inlet and exit edge portions of thickened or bulbous section such that the section of the blade portion extends beyond the boundaries of the normal blade section having relatively sharp inlet and exit edges; assembling such blades in a segment; the root portions of the blades of the segment having the adjacent side and bottom edges and the shroud portions thereof having the adjacent side and top edges beveled so as to form V-grooves; depositing weld metal in the grooves to form a unitary segment comprising shroud and root constructions joined by blades; machining the shroud and root constructions to provide smooth side faces, a smooth outer or top face for the shroud construction, and a smooth lower or bottom face for the root construction; and thereafter machining the thickened inlet and exit edges of the blade portions to provide edges of desired sharpness.

CLARENCE C. FRANCK.